Oct. 28, 1958        B. D. SMITH        2,858,065
NUMERAL WHEEL CONTROLLED SHUTTER
Filed March 18, 1955        3 Sheets-Sheet 1
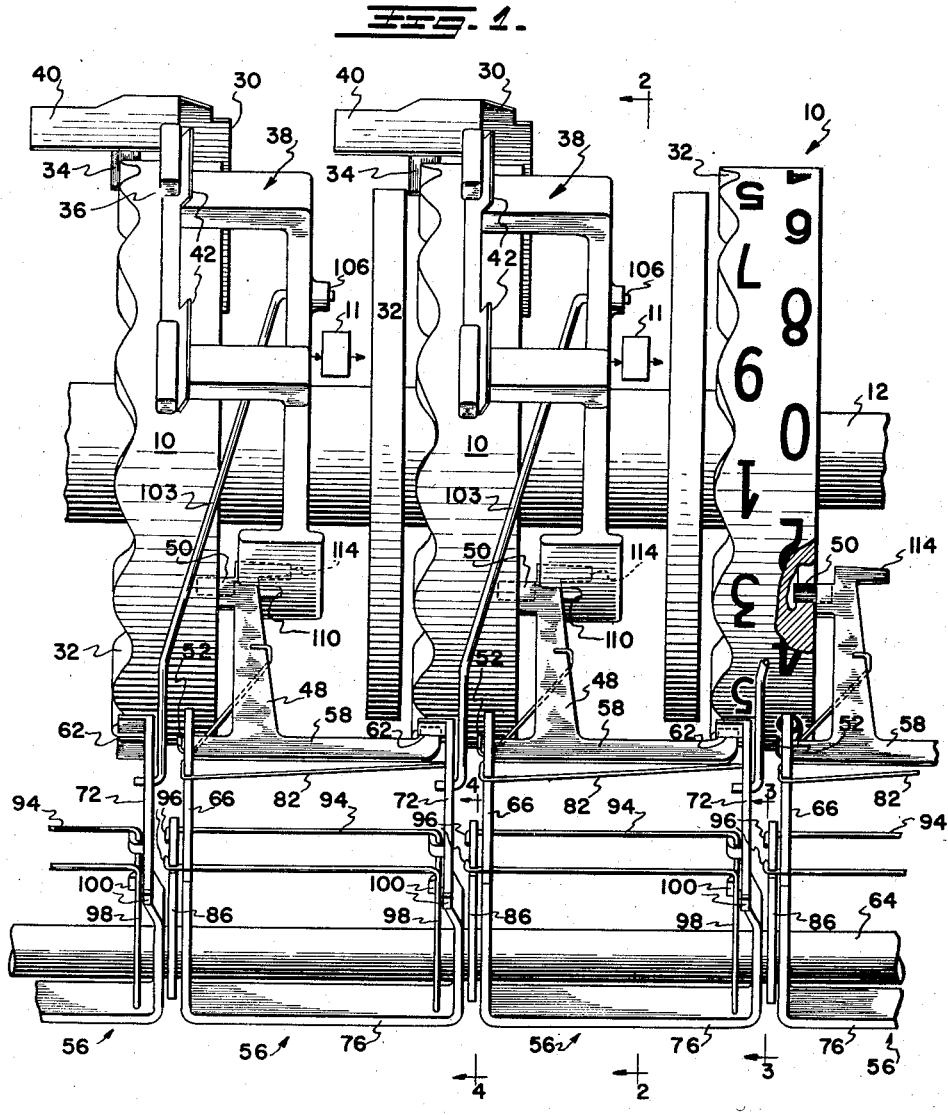
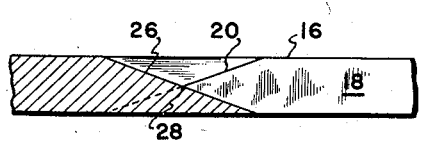
INVENTOR
BLANCHARD D. SMITH
BY
ATTORNEY

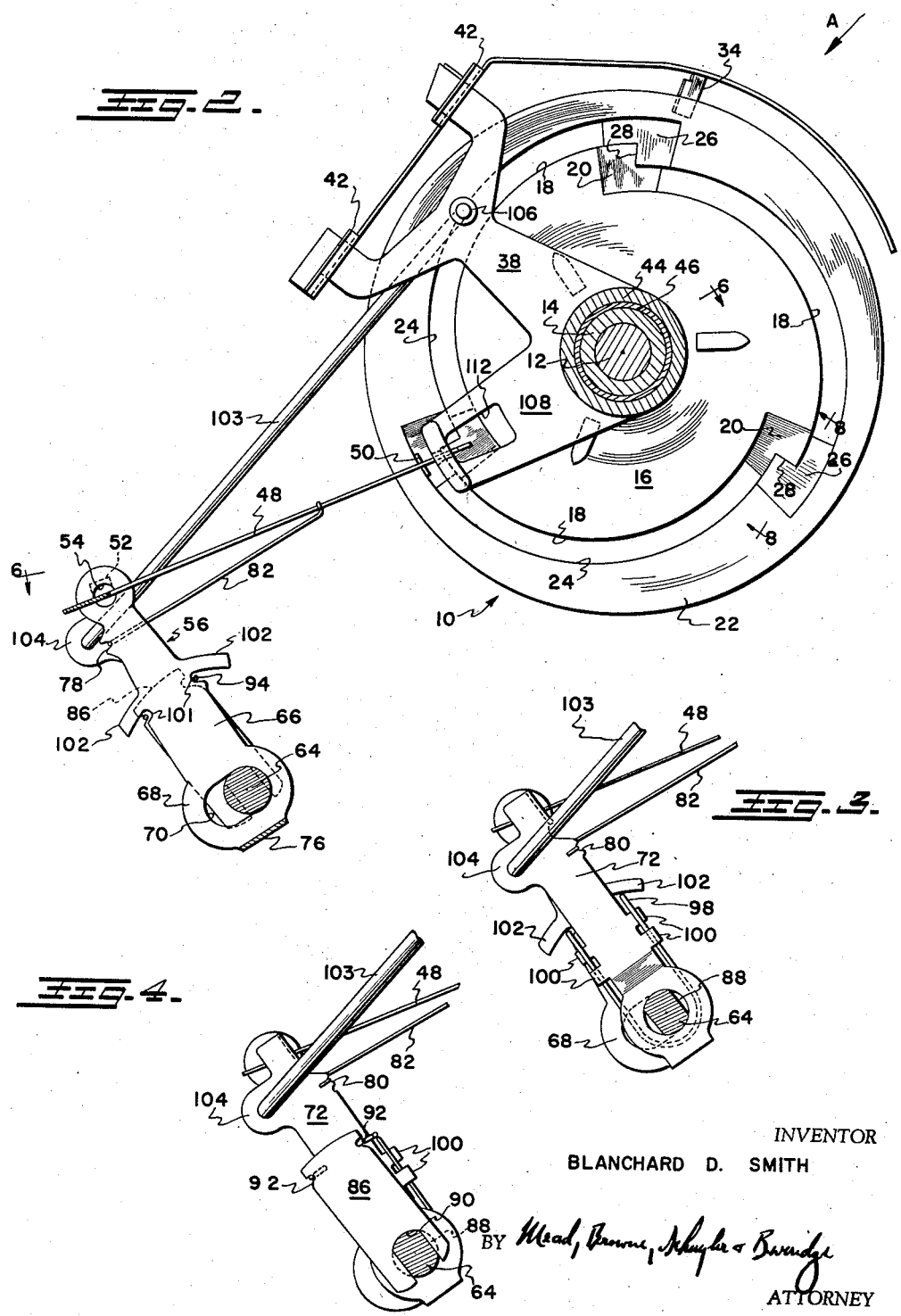

Oct. 28, 1958    B. D. SMITH    2,858,065
NUMERAL WHEEL CONTROLLED SHUTTER
Filed March 18, 1955    3 Sheets-Sheet 3
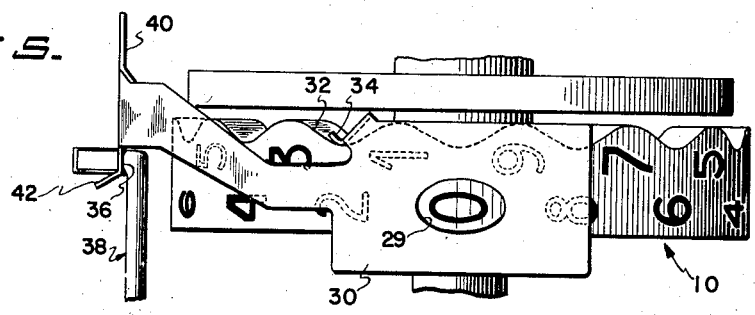
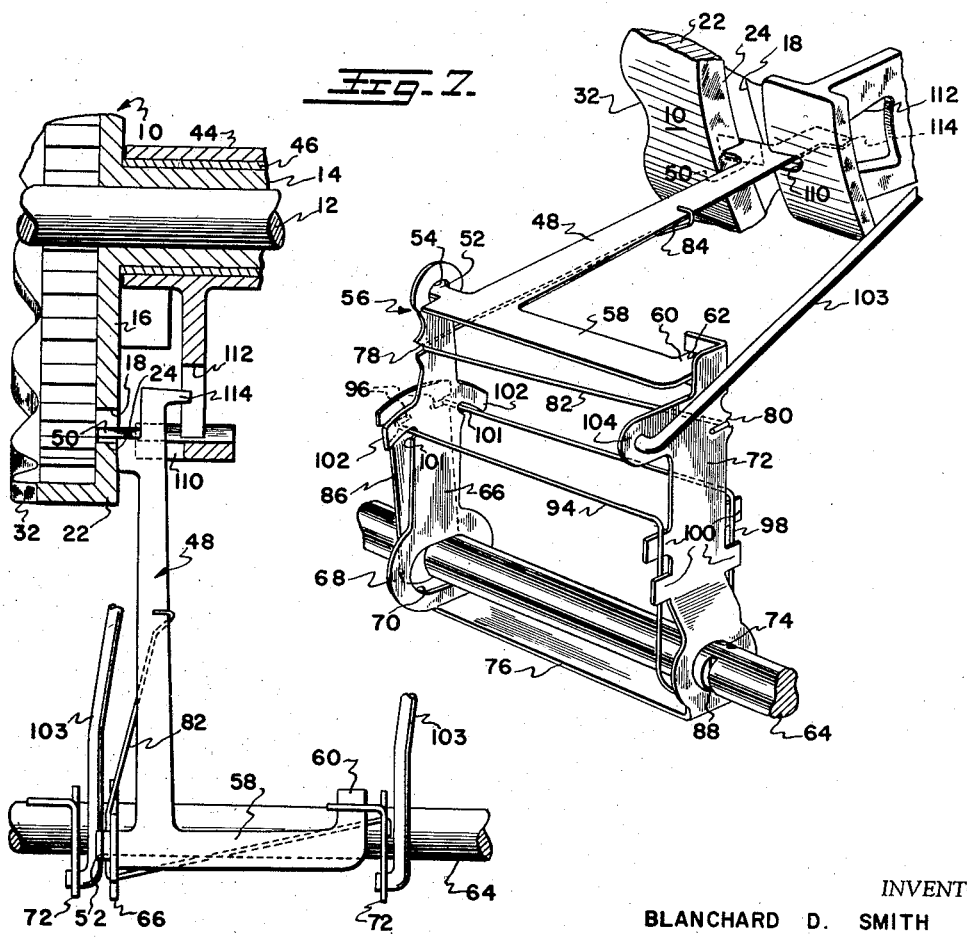
INVENTOR
BLANCHARD D. SMITH
BY Mead, Browne, Schuyler & Beveridge
ATTORNEY

United States Patent Office 2,858,065
Patented Oct. 28, 1958

2,858,065

NUMERAL WHEEL CONTROLLED SHUTTER

Blanchard D. Smith, Atlanta, Ga.

Application March 18, 1955, Serial No. 495,296

14 Claims. (Cl. 235—1)

This invention relates to a calculating machine and more particularly to calculating machine numeral wheels and mechanism associated therewith to obtain proper viewing of numerals on said numeral wheels. This application is a continuation-in-part of my copending application Serial No. 234,253, now Patent No. 2,783,945, filed June 29, 1951.

The numeral wheel portion of a calculating machine customarily includes mechanism whereby motion of a lower order wheel results in a correspondingly reduced motion of its adjacent higher order wheel. For example, where the calculating machine operates in a decimal system, movement of the units wheel from zero to zero results in movement of the tens wheel from one digit to the next adjacent digit. Such movement of the higher order wheel is sometimes referred to as crawl movement and the mechanism which causes the movement sometimes referred to as tens transfer mechanism. It is evident that if the lower order wheel moves less than ten digits, its adjacent higher order wheel does not go fully from one digit to the next digit, zero to one for example, and thus neither the zero nor the one is fully displayed in the usual viewing aperture of the calculating machine.

For accurate reading, it is desirable to maintain a full view of the correct numeral being displayed by a higher order numeral wheel and numerous mechanisms have been devised to compensate for the crawl action of the higher order numeral wheel. Some mechanisms, in effect, store the crawl motion so that it is imparted to the higher order numeral wheel only when this wheel is to be moved a full digit. However, crawl compensation mechanisms of the type known prior to the present invention suffer the objection that they tend to be complicated and hence increase the expense of the calculating machine particularly where the calculating machine numeral wheels are adapted to be rotated in opposite directions for addition and subtraction, respectively. The present invention is directed to the problem of maintaining a full view of the correct numeral of a higher order numeral wheel despite movement of such a numeral wheel caused by movement of its associated lower order numeral wheel.

It is therefore an object of the present invention to provide a new and improved calculating machine numeral wheel assembly whereby a full view is obtained of the correct number being displayed by a higher order numeral wheel despite movement of this wheel caused by movement of its associated lower order numeral wheel.

It is another object of the present invention to provide a new and improved calculating machine numeral wheel and mechanism associated therewith whereby such a full view may be obtained.

It is a further object of the present invention to provide new and improved means for viewing numerals displayed by a calculating machine numeral wheel.

It is still another object of the present invention to provide a new and improved calculating machine numeral wheel.

Briefly described, a preferred embodiment of the present invention comprises a plurality of similarly shaped spaced apart numeral wheels mounted for rotation about a common numeral wheel supporting shaft. Each numeral wheel is rotatable in one direction for addition and in the opposite direction for subtraction. Insofar as structure is concerned, each numeral wheel comprises a rim portion and a body portion which define a plurality of spiral shaped slots which extend completely through the thickness of the numeral wheel and also extend in a direction generally circumferentially of the numeral wheel. The slots are separated by bridging portions, hereinafter sometimes referred to as having transition surfaces, which connect the rim portion to the body portion. A plurality of sets of numbers are printed or otherwise suitably placed on the circumferential surface of each numeral wheel, there being a set of numbers associated with each spiral slot. The numbers in each set of numbers are disposed in a staggered arrangement and a side surface of the rim portion has an undulating surface formed thereon, the undulations corresponding to the staggered arrangement of the numbers. A window plate overlies each numeral wheel and has an aperture therein of sufficient size to permit one numeral to be viewed fully. The window plate is supported by a yoke pivotally mounted on the hub of the numeral wheel. A movable linkage mechanism connects the yoke to a follower which rides in one of the slots of the next lower order numeral wheel. When the next lower order numeral wheel turns, the yoke is moved in a direction and in an amount corresponding to the crawl movement imparted to the higher order numeral wheel. In this way, the viewing aperture maintains its correct alignment with the correct numeral of the higher order wheel.

If the lower order wheel turns an amount sufficient to pass a zero on this wheel, the follower associated therewith passes over the bridging portion between two adjacent slots and causes the window plate associated with the next higher order wheel to move to the next succeeding numeral on this wheel. A follower on the window plate engages the undulating surface at the side of the rim portion of this higher order wheel to cause the window plate to follow the staggered arrangement of the numerals. The mechanism thus maintains the correct numeral of the higher order wheel in full view at all times and is effective during both direct addition and subtraction.

Other objects and advantages of my invention will become readily apparent by reference to the following specification taken in conjunction with the accompanying drawings.

In the drawings:

Fig. 1 is an elevation view showing three orders of numeral wheels. Certain parts have been shown in partial cross section while other parts have been partially or wholly omitted for the sake of clarity;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a partial view of the structure shown in the preceding figures taken in the direction of the arrow A in Fig. 2;

Fig. 6 is a partial sectional view taken on line 6—6 of Fig. 2;

Fig. 7 is a perspective view of certain parts of the structure shown in Fig. 1; and Fig. 8 is a sectional view taken on line 8—8 of Fig. 2.

Referring first to Fig. 1, a plurality of numeral wheels indicated generally by the numeral 10 are rotatably supported for rotation in either of two directions about a common numeral wheel supporting shaft 12. For sake of clarity, the key actuated mechanism for directly actuating each numeral wheel is omitted. Also for sake of clarity, details of the usual mechanism for imparting crawl movement to a higher order numeral wheel in response to rotation of a lower order numeral wheel have been omitted. Instead of a detailed showing, such mechanism is indicated generally by the blocks 11 shown in Fig. 1. An example of one type of mechanism represented by blocks 11 for imparting such crawl movement to a higher order numeral wheel is that disclosed in United States Letters Patent 1,828,180, issued October 20, 1931, to Clyde Gardner. As explained above, such mechanism continuously transmits movement from an actuated lower order numeral wheel to a higher order numeral wheel in direct proportion to the amount of movement imparted to the lower order numeral wheel. For the purposes of the present description, the crawl movement of a higher order numeral wheel may be assumed to be one-tenth of the movement of its adjacent lower order numeral wheel.

Each of the numeral wheels 10 shown in Fig. 1 is identical and a description of one will be understood to be equally applicable to any of the others. While only three orders of numeral wheels have been disclosed in Fig. 1, it is obvious that the number of orders of numerals is capable of variation. Referring to Fig. 2, the numeral wheel 10 is mounted upon shaft 12 by means of hub portion 14. Integral with hub portion 14 is a main or body portion 16 having circumferentially extending surfaces formed as a plurality of cam surfaces 18. Each of the cam surfaces 18 has a generally spiral configuration in which the radial distance from the axis of shaft 12 to cam surface 18 increases proportionally to the angular displacement from the closest position from cam surface 18 to the axis of shaft 12. Each numeral wheel disclosed in the present application is provided with three series of numerals and therefore three similar cam surfaces 18 of equal arcuate length are provided. The transition between the ends of adjacent cam surfaces 18 includes a sloping cam surface 20 (note Fig. 8).

A rim portion 22 is integral with main body portion 16. As seen in Fig. 2, the inner periphery of rim portion 22 is formed as a plurality of cam surfaces 24 which are spaced from and parallel to corresponding cam surfaces 18 on main body portion 16. The spacing between cam surfaces 18 and cam surfaces 24 defines a slot of constant width which extends from sloping cam surface 20 on main body portion 16 to an oppositely sloped cam surface 26 located on rim portion 22. As best seen in Fig. 8, the oppositely sloped cam surfaces 20 and 26 intersect each other and are overlapped to form a bridging portion including a notch-like transition surface 28 defined by the intersection of the planes of the sloping surfaces. Since the cam slots defined by cam surfaces 18 and 24 extend entirely through the numeral wheel, the intersecting surfaces 20 and 26 also provide a means for securing rim portion 22 to main body portion 16.

Referring now to Figs. 1 and 5, the periphery of rim portion 22 has a plurality of series of consecutive numerals disposed thereon. In the disclosed embodiment, there are three series of numerals each of which includes consecutive numerals from 0 to 9. Ordinarily, a numeral wheel having three series of numerals disposed upon its circumference would necessarily be of relatively large diameter since, for observation by the machine operator the numerals must be of a certain size and, in addition, spacing must be present between the numerals. In order to reduce the size of the wheel, while at the same time employing three series of numerals, succeeding numerals are spaced axially from each other in the manner clearly shown in Figs. 1 and 5 and thus allow a substantial reduction in the circumferential spacing of successive numerals.

The numerals are displayed to the operator through a viewing aperture 29 in a viewing means or window plate 30. Due to the axial offsetting of successive numerals, the axial position of the window plate 30 must be varied in accordance with the axial position of the numeral to be displayed. Axial positioning of window plate 30 is accomplished by an undulating cam surface 32 upon one side face of numeral wheel 10 which engages a projecting follower or toe 34 integral with window plate 30. Window plate 30 is pivotally mounted as at 36 (see Fig. 5) upon a yoke generally designated 38 and the interaction between cam surface 32 and toe 34 pivots window plate 30 between the axial positions of successive numerals.

Referring to Figs. 1 and 5, it is noted that window plate 30 has an extending portion or projecting arm 40. The mass of the entire window plate, including the extending portion 40, is such that follower 34 normally presses against cam surface 32. However, when numeral wheel 10 is actuated directly to enter a number therein one of the peaks of cam surface 32 rather rapidly moves follower 34 with the result that the follower is swung in a counterclockwise direction as viewed in Figs. 1 and 5 free of the cam surface. In fact, the motion is such that the entire window plate swings counterclockwise about pivot 36, the counterclockwise movement being limited by projecting lugs 42 which are integral with window plate 30, and the window plate follower 34 remains out of engagement with cam surface 32 until the numeral wheel has completed its movement. Then, because of the inertia of the entire window plate, which includes extending portion 40 which contributes to the inertia of the window plate, the window plate swings clockwise about pivot 36 relatively slowly until follower 34 again engages cam surface 32. The relatively delicate balance of the window plate assembly about pivot 36 thus prevents the follower from bumping across the peaks of cam surface 32 when the numeral wheel is actuated directly. Instead, follower 34 is swung clear of the cam surface peaks and remains clear of these peaks until the numeral wheel motion has ceased.

As seen in Fig. 2, yoke 38 is rotatably mounted by means of hub 44 and bushing 46 for rotation about hub 14 of numeral wheel 10. The rotary movement of yoke 38 is derived from rotation of the next lower order numeral wheel. The mechanism which accomplishes this movement is shown most clearly in Figs. 1 and 7.

An L-shaped cam follower 48 is formed from a piece of sheet material and has a projecting feeler or toe 50 located adjacent the upper end of the L. Feeler 50 is disposed within the slot defined by cam surfaces 18 and 24 and normally is in engagement with one of these surfaces. At the intersection of the arms of the L, a projecting lug 52 is engaged within a hole 54 in one leg 66 of a U-shaped crank generally indicated by numeral 56. The horizontal arm 58 of L-shaped cam follower 48 has a projecting toe 60 at its distal end which is slidably received within a slot 62 formed in the opposite leg 72 of U-shaped crank 56. Toe 60, in cooperation with slot 62 and lug 52 assures that L-shaped cam follower 48 will not tilt out of the desired alignment with numeral wheel 10.

U-shaped crank 56 is supported for rotation about shaft 64 which is mounted within the machine in parallel relationship with numeral wheel supporting shaft 12. As best seen in Fig. 7, leg 66 of U-shaped crank member 56 has an enlarged portion 68 at its lower end which is provided with an elongated slot 70 for reception of shaft 64. The other vertical leg 72 has a hole 74 of circular shape at its lower portion which is enlarged only to a degree of looseness sufficient to permit leg 66 of U-shaped crank 56 to pivot sufficiently to engage shaft 64 at either end of slot 70. Crosspiece 76, which is integral with both legs 66 and 72, fixedly couples these legs to each other so that rotary movement of either leg about shaft 64 is directly transmitted to the opposite leg.

Adjacent their upper ends, legs 66 and 72 are provided with locating notches 78 and 80 for locating spring 82. Spring 82 has a bent-over portion 84 which engages L-shaped cam follower 48 and acts to bias follower 48 firmly against the side surface of numeral wheel 10 in order to assure that feeler 50 remains within the slot defined by cam surfaces 18 and 24. The biasing action of spring 82 is also desirable, as will be explained below, during the transition movement of feeler 50 between successive sets of cam surfaces.

Elongated slot 70 allows the shifting of U-shaped frame 56 between the position shown in Fig. 7 and a position wherein the leftmost end of slot 70 (as viewed in Fig. 7) abuts against shaft 64. The shifting of U-shaped crank 56 between the two positions is accomplished by shifting arm 86. As seen in Fig. 7, shaft 64 is provided with a series of opposed slots 88 and the lower end of arm 86 is slotted as at 90 (see Fig. 4) to snugly engage arm 86 within slots 88 upon shaft 64. Adjacent its upper end, shifting arm 86 has a pair of spring locating notches 92 which are adapted to engage two opposed legs of a torsion type spring 94. The ends of the legs of spring 94 are bent inwardly as at 96 and at their opposite ends, the legs of spring 94 are connected by a vertically disposed U-shaped connecting portion 98 which is located with respect to U-shaped crank 56 by ears 100 integral with leg 72 of crank 56. Leg 66 of crank 56 is also provided with locating notches 101 for reception of the legs of spring 94. Immediately above notches 101, projecting arms 102 serve as extensions of notches 101 to locate spring 94 when rotation of crank 56 disengages spring 94 from either of notches 101.

Means of any suitable construction, not shown, are connected between shaft 64 and the add-subtract positioning key of the calculating machine to position the shaft in one position when addition is being performed and in another position when subtraction is being performed. Movement of the add-subtract key is transmitted to shaft 64 and causes rotation of shaft 64 when the add-subtract key is moved from one position to the other. Rotation of shaft 64 carries with it shifting arm 86 and rotary movement of shifting arm 86 is transmitted by means of spring 94 to leg 66 of U-shaped crank 56. The rotary movement of shaft 64 and arm 86 is not very great and need only cover an arcuate distance at notches 92 slightly greater than the amount of play between slot 70 and shaft 64.

To transmit rotary movement of crank 56 to the window plate 30 associated with the next higher order numeral wheel, shifting link 103 is pivotally mounted at one end to a projection 104 on leg 72 of crank 56 and is pivotally secured at its other end within a bore 106 in yoke 38. It should be noted that the link 103 extends between a U-shaped crank 56 which is actuated by a cam follower 48 associated with a lower order numeral wheel to the yoke 38 which is associated with the next higher order numeral wheel. Thus, for example, motion imparted to cam follower 48 by the cam surfaces of the units order numeral wheel is transmitted to crank 56 and, by means of link 103, rotary movement of crank 56 is transmitted to the window plate associated with the tens order numeral wheel.

*Operation*

The mechanism, as illustrated in Fig. 2, shows the U-shaped crank member 56 disposed in position for an adding operation, with shaft 64 and shifting arm 86 disposed in their extreme counterclockwise position. As shown in Fig. 2, the right-hand leg of the spring 94 abuts against the right-hand spring locating notch 101 of leg 66, thus biasing the right-hand limit of the slot 70 against shaft 64. With leg 66 disposed in this position, L-shaped cam follower 48 is positioned with its toe 50 in abutment with a cam surface 24 upon numeral wheel 10 as shown in Fig. 2. The toe is resiliently biased against the cam surface 24 by the action of the right-hand leg of spring 94 as viewed in Fig. 2.

The relationship between the toe of the cam follower 50 and the cam surface 24 in Fig. 2 is that which is present when the numeral 0 is visible through the viewing aperture 29 in window plate 30. Upon actuation of the numeral wheel in an adding operation, the wheel as viewed in Fig. 2 will rotate clockwise. As has been previously stated, the inertia of window plate 30 about its axis is such that when the wheel is directly actuated by a key, sufficient acceleration is imparted to swing the window plate counterclockwise as viewed in Fig. 5 out to a position clear of the peaks of cam surface 32. Due to the predetermined inertia of window plate 30, which includes the mass 40, the plate does not swing back to position against the wheel until the wheel has completed its rotation.

Returning to Fig. 2, as the wheel 10 rotates in a clockwise direction, the spiral configuration of cam surface 24 draws cam follower 48 to the right as viewed in Fig. 2, thus imparting a clockwise rotation to U-shaped crank 56 about shaft 64. Referring now to Fig. 7, it will be seen that clockwise rotation of U-shaped crank 56 will cause shifting link 103 to move to the right, as viewed in Fig. 7, and this movement of shifting link 103 is directly transmitted to yoke 38 upon which the window plate 30 associated with the next higher order numeral wheel is mounted. It will be understood that this next higher order numeral wheel is being simultaneously rotated through means of a conventional "crawl" or tens transfer mechanism which couples this higher order numeral wheel with its adjacent lower order numeral wheel. The motion imparted to the window plate 30 associated with the higher order numeral wheel is exactly the same angular displacement imparted to the higher order numeral wheel by the tens transfer mechanism and thus, the viewing aperture 29 in window plate 30 moves simultaneously with the higher order numeral wheel, thereby maintaining an aligned relationship with the originally displayed numeral.

The foregoing description has assumed the input of a single number into the lower order numeral wheel. When sufficient numbers have been entered into the lower order numeral wheel to cause rotation of the lower order numeral wheel to the second series of numerals, as for example when 9 is added to 6, the window plate associated with the adjacent higher order numeral wheel must be actuated to move from a position in which the numeral 0 is indicated to a position in which the numeral 1 is indicated. This action is accomplished in the following manner.

As the lower order numeral wheel is driven from the numeral 9 of the first series of numerals to the numeral 0 in the second series of numerals, the toe 50 of cam follower 48 engages the sloping cam surface 20 of the numeral wheel. Continued rotation of the numeral wheel causes the toe 50 to be moved axially with respect to the numeral wheel as the toe moves up the incline of surface 20 (see Fig. 8) and eventually, the toe 50 moves into radial alignment with transition surface 28. Since the spring 94 is at all times biasing leg 66 in a counterclockwise direction as viewed in Fig. 2, as soon as the toe 50 becomes aligned with transition surface 28, the spring 94 causes the leg 66 to rotate counterclockwise and pull cam follower toe 50 radially outward onto cam surface 26. Spring 82 is acting at all times to bias cam follower 48 against the numeral wheel 10. Rotation of crank 56 continues until the toe 50 of cam follower 48 is in abutting engagement with the cam surface 24 associated with the next series of numerals. Continued rotation of the lower order numeral wheel causes cam surface 24 to actuate cam follower 48, crank 56, link 103 and window plate 30 in the same manner as described previously.

In order to assure that the cam follower 50 does not become disengaged from the cam surfaces 24, 20, 26 and the next cam surface 24 during the transition just described, an integral leg 108 is provided on yoke 38. Leg 108 is provided with an axially extending opening 110 and a radially extending opening 112. The axially extending opening 110 limits movement of cam follower 48 in an axial direction away from the numeral wheel with which it is associated, while the radially extending opening 112 limits, in cooperation with projection 114 on cam follower 48, the radial displacement of cam follower 48 with respect to numeral wheel 10.

When a subtraction operation is to be performed by the machine, the "crawl" or tens transfer movement acts in the opposite direction, and therefore the mechanism must act to drive the window plate 30 accordingly. In order to follow a subtraction operation, the shaft 64 and shifting arm 86 are rotated clockwise as viewed in Fig. 2 by suitable mechanism, not shown, coupled to the add-subtract key upon the adding machine. The clockwise rotation of shifting arm 86 causes this arm to engage the left-hand leg of spring 94 (as viewed in Fig. 2) and shift leg 66 of crank 56 from the position shown in Fig. 2 to a position in which the left-hand end of slot 70 abuts the shaft 64. Movement of leg 66 in this manner causes the toe 50 of the cam follower 48 to be shifted from a position in abutment with cam surface 24 to one in abutment with cam surface 18.

Actuation of a lower order numeral wheel to perform a subtraction operation causes the numeral wheel to rotate counterclockwise as viewed in Fig. 2. As the numeral wheel rotates in a counterclockwise direction, the cam surface 18 pushes the cam follower 48 to the left as viewed in Fig. 2, thus imparting a counterclockwise rotation to U-shaped crank 56 which is transmitted by shifting link 103 to the yoke 38 and window plate 30 associated with the next higher order numeral wheel. It will be noted that in the case of subtraction, the biasing action of spring 94 is such as to bias the leg 66 in a clockwise direction as viewed in Fig. 2 and thus, the spring 94 tends to push the toe 50 of the cam follower 48 radially inwardly thus assuring a firm abutment with the surface 18. The transition of the toe 50 between successive cam surfaces 18 is accomplished in reverse manner as compared to its transition during an addition operation in that the toe 50 is first driven up cam surface 26, then across transition surface 28 onto cam surface 20 and downwardly into the next succeeding slot.

It will be noted that the structure employed is exceedingly well adapted to mass production. The numeral wheel itself, and the yoke 38 may be made from molded plastic material for lightness and economy of manufacture. The remaining elements such as cam follower 48, shifting arm 86, and U-shaped crank 56 are especially adapted for production from sheet metal material and require no precision machining of any type.

While I have described and illustrated a preferred embodiment of my invention, I wish it to be understood that I do not intend to be restricted solely thereto but that I do intend to cover all modifications thereof which would be apparent to one skilled in the art and which come within the spirit and scope of my invention.

What I claim as my invention is:

1. A numeral wheel assembly useful in a calculating machine, said assembly comprising a numeral wheel supporting shaft, a plurality of spaced apart similarly shaped numeral wheels mounted on said shaft for rotation in either of two directions, means connecting each adjacent pair of numeral wheels to transmit crawl movement to the higher order wheel of the pair in response to rotation of the lower order wheel of the pair, viewing means positioned adjacent to and covering a portion of the circumference of each numeral wheel, each numeral wheel circumference having a series of numerals thereon and each viewing means having an aperture therein of size such that one numeral may be viewed fully when centered with respect to said aperture, means movably supporting each viewing means, movable means operably connecting the viewing means supporting means of a higher order numeral wheel to the lower order numeral wheel adjacent said higher order numeral wheel, cam means including a first and second cam surface on said adjacent lower order numeral wheel, means positionable in accordance with the direction of rotation of said numeral wheels for selectively engaging said connecting means with one of said cam surfaces, to move said connecting means and thereby move the viewing means supporting means of said higher order numeral wheel when said adjacent lower order numeral wheel is rotated, the extent and direction of said movement corresponding to the crawl movement imparted to said higher order numeral wheel by said adjacent lower order numeral wheel whereby the viewing aperture in said viewing means moves to maintain a numeral on the circumference of said higher order numeral wheel in full view during crawl movement of said higher order numeral wheel.

2. A numeral wheel assembly useful in a calculating machine, said assembly comprising a numeral wheel supporting shaft, a plurality of spaced apart similarly shaped numeral wheels mounted on said shaft for rotation in either of two directions, means connecting each adjacent pair of numeral wheels to transmit crawl movement to the higher order wheel of the pair in response to rotation of the lower order wheel of the pair, viewing means positioned adjacent to and covering a portion of the circumference of each numeral wheel, each numeral wheel circumference having a series of numerals thereon and each viewing means having an aperture therein of size such that one numeral may be viewed fully when centered with respect to said aperture, means movably supporting each viewing means, movable means operably connecting the viewing means supporting means of a higher order numeral wheel to the lower order numeral wheel adjacent said higher order numeral wheel, cam means including a first and a second cam surface on said adjacent lower order numeral wheel, means positionable in accordance with the direction of rotation of said numeral wheels for selectively engaging said connecting means with one of said cam surfaces to move said connecting means and thereby move the viewing means supporting means of said higher order numeral wheel when said adjacent lower order numeral wheel is rotated, the extent and direction of said movement corresponding to the crawl movement imparted to said higher order numeral wheel by said adjacent lower order numeral wheel whereby the viewing aperture in said viewing means moves to maintain a numeral on the circumference of said higher order numeral wheel in full view during crawl movement of said higher order numeral wheel, and means on said adjacent lower order numeral wheel engageable by said connecting means to shift the viewing means associated with said higher order wheel to bring an adjacent numeral on the circumference of said higher order numeral wheel into view within the viewing means aperture when said adjacent lower order numeral wheel has rotated a predetermined amount.

3. A numeral wheel assembly useful in a calculating machine, said assembly comprising a higher order numeral wheel, a lower order numeral wheel, a numeral wheel supporting shaft, said numeral wheels being rotatably mounted on said shaft for rotation in one direction for addition and in the opposite direction for subtraction, means connecting said numeral wheels to impart crawl movement to said higher order numeral wheel in response to rotation of said lower order numeral wheel, said higher order numeral wheel having a series of numerals on the circumference thereof, a window plate positioned adjacent to and covering a portion of said higher order numeral wheel circumference, said window plate having an aperture therein of size such that one numeral of the numerals on said higher numeral wheel circumference may be viewed fully when centered in said aperture, means connected to and supporting said window plate for movement about said numeral wheel shaft, cam means on said lower order numeral wheel including a first and a second cam surface, movable means connected to and extending from said window plate supporting means into contact with one of said cam surfaces, whereby said contacting means is moved in response to rotation of said lower order numeral wheel to move said window plate supporting means, means engageable with said contacting means to engage said contacting means with said first cam surface during an addition operation and to engage said contacting means with said second cam surface during a subtraction operation, the extent and direction of movement of said window plate supporting means being such that said window plate aperture is moved in accordance with the crawl imparted to the higher order numeral wheel by the lower order numeral wheel whereby the correct numeral is maintained in view within said window plate aperture during crawl movement of said higher order numeral wheel, and means to shift said window plate aperture to an adjacent numeral on the circumference of said higher order numeral wheel when said lower order numeral wheel has rotated a predetermined amount, the direction of said shift depending upon the direction of rotation of said lower order numeral wheel.

4. A numeral wheel assembly useful in a calculating machine, said assembly comprising a numeral wheel supporting shaft, a pair of similarly shaped numeral wheels rotatably supported on said shaft for rotation in one direction for addition and in the opposite direction for subtraction, each of said numeral wheels having consecutive numerals on the circumference thereof proceeding from 0 to 9, tens transfer mechanism connecting said numeral wheels together whereby rotation of the lower order numeral wheel in one direction causes the higher order numeral wheel to rotate in the same direction one-tenth the amount of rotation of the lower order numeral wheel, a window plate positioned adjacent to and covering a portion of the circumference of the higher order numeral wheel, said window plate having an aperture therein of size such that a numeral on the higher order numeral wheel circumference may be viewed fully when centered in said aperture, means connected to and supporting said window plate for turning movement with said higher order numeral wheel, a window plate actuating arm connected to and extending from said supporting means, a movable cam follower, means connecting said cam follower to said window plate actuating arm to transmit movement of said cam follower to said arm, a first cam surface and a second cam surface on said lower order numeral wheel selectively engageable by said cam follower, means for engaging said cam follower with said first cam surface when said calculating machine is conditioned for an addition operation and for engaging said cam follower with said second cam surface when said calculating machine is conditioned for a subtraction operation, said cam surfaces defining opposed walls of a slot extending circumferentially of said lower order numeral wheel whereby rotation of said lower order numeral wheel causes movement of said cam follower, said connecting means transmitting and modifying the movement of said cam follower in a manner such that said window plate is moved in accordance with the crawl movement imparted to said higher order numeral wheel by said lower order numeral wheel whereby the correct numeral is maintained in view within said window plate aperture during crawl movement of said higher order numeral wheel.

5. A numeral wheel assembly according to claim 4 wherein each numeral wheel has a plurality of sets of consecutive numerals on its circumference, the lower order numeral wheel has a generally circumferentially extending spiral cam surface associated with each set of numerals and has a transition surface extending between an end of one spiral cam surface and an end of an adjacent spiral cam surface, said cam follower being movable from one cam surface across said transition surface, to the next cam surface, movement of said cam follower across said transition surface to the next cam surface causing movement of said window plate viewing aperture from one numeral on the higher order numeral wheel circumference to an adjacent numeral on said circumference.

6. A numeral wheel assembly useful in a calculating machine, said assembly comprising a numeral wheel supporting shaft, a numeral wheel rotatably supported on said shaft for rotation in either of two directions, said numeral wheel having a plurality of consecutive numerals on the circumference thereof, movable viewing means positioned adjacent to and covering a portion of the circumference of said numeral wheel, said viewing means having a viewing aperture therein of size such that a numeral on said numeral wheel circumference may be viewed fully when centered in said aperture, and means connected to and supporting said viewing means for movement with said numeral wheel whereby said aperture can maintain a numeral on said numeral wheel circumference in full view despite movement of said numeral wheel, said supporting means being movable in either of two directions whereby the viewing means can follow the movement of said numeral wheel irrespective of whether said numeral wheel is turned in one direction or in the opposite direction, said viewing means supporting means also being shiftable to shift said viewing means with respect to said numeral wheel circumference and axially thereof whereby another numeral on said numeral wheel circumference may be brought into view within said aperture.

7. A numeral wheel assembly useful in a calculating machine, said assembly comprising a numeral wheel supporting shaft, a numeral wheel rotatably supported on said shaft for rotation in one direction for addition and in the opposite direction for subtraction, said numeral wheel having a plurality of consecutive numerals from 0 to 9 on the circumference thereof, consecutive numerals being uniformly offset from each other so that all of the even numerals are aligned and all of the odd numerals are aligned, a movable window plate positioned adjacent to and covering a portion of said numeral wheel circumference, said window plate having a viewing aperture therein of size such that a numeral on said numeral wheel circumference may be viewed fully when centered in said aperture, and means connected to and supporting said window plate for movement with said numeral wheel whereby said aperture may maintain a numeral in full view despite movement of said numeral wheel, said window plate being movably connected to said supporting means whereby said window plate may also move in a generally axially extending direction with respect to said numeral wheel circumference to bring another numeral on said numeral wheel circumference into view in said window plate aperture.

8. A numeral wheel assembly according to claim 7 wherein said numeral wheel includes an undulating surface extending in a circumferential direction adjacent the circumference of the numeral wheel and said window plate includes a follower engaging said undulating surface, movement of said follower along said surface causing said window plate to move back and forth in a generally axial direction with respect to said numeral wheel whereby the window plate aperture can follow the offset arrangement of the numerals on the numeral wheel circumference.

9. A numeral wheel assembly useful in a calculating machine, said assembly comprising a numeral wheel supporting shaft, a numeral wheel rotatably supported on said shaft for rotation in one direction for addition and in the opposite direction for subtraction, said numeral wheel having a plurality of consecutive numerals on the circumference thereof, adjacent numerals being uniformly offset from each other in a direction axially of said numeral wheel, movable viewing means positioned adjacent to and covering a portion of said numeral wheel circumference, said viewing means having a viewing aperture therein of size such that a numeral on said numeral wheel circumfernece may be viewed fully when centered in said aperture, means supporting said viewing means for swinging movement with respect to said numeral wheel circumference whereby said viewing aperture can follow the offset disposition of said numerals, means on said numeral wheel to cause swinging movement of said viewing means when said numeral wheel is rotated, and means on said viewing means engaging said numeral wheel means to swing said viewing means with respect to said numeral wheel circumference when said numeral wheel is rotated.

10. A numeral wheel assembly useful in a calculating machine, said assembly comprising a numeral wheel supporting shaft, a numeral wheel rotatably supported on said shaft for rotation in one direction for addition and in the opposite direction for subtraction, said numeral wheel having a plurality of consecutive numerals on the circumference thereof, adjacent numerals being circumferentially and axially uniformly offset from each other whereby said numerals are disposed in a staggered pattern on said numeral wheel circumference, a window plate positioned adjacent to and covering a portion of said numeral wheel circumference, said window plate having a viewing aperture therein of size much that a numeral on said numeral wheel circumference may be viewed fully when centered in said aperture, means supporting said window plate for swinging movement with respect to said numeral wheel circumference whereby said window plate aperture may follow the staggered pattern of said numerals, an undulating surface on said numeral wheel extending circumferentially adjacent the numeral wheel circumference, and a follower on said window plate engaging said undulating surface to swing said window plate when said numeral wheel turns.

11. A numeral wheel assembly according to claim 10 wherein said window plate includes a projecting arm to increase the inertia of said window plate, whereby said window plate swings relatively slowly when swinging freely.

12. A numeral wheel useful in a calculating machine, said numeral wheel including a plurality of pairs of opposed elongated spiral cam surfaces extending in a generally circumferential direction with respect to said numeral wheel, adjacent ends of said cam surface pairs overlapping each other, there being a bridging portion extending between said overlapping adjacent ends whereby a cam follower may proceed from one cam surface of a pair, across said bridging portion, to the corresponding surface of the adjacent cam surface pair.

13. A numeral wheel assembly useful in a calculating machine, said assembly comprising a numeral wheel supporting shaft, a pair of similarly shaped numeral wheels rotatably supported on said shaft for rotation in one direction for addition and in the opposite direction for subtraction, each of said numeral wheels having consecutive numerals on the circumference thereof proceeding from 0 to 9, tens transfer mechanism connecting said numeral wheels together whereby rotation of the lower order numeral wheel in one direction causes the higher order numeral wheel to rotate in the same direction one-tenth the amount of rotation of the lower order numeral wheel, a window plate positioned adjacent to and covering a portion of the circumference of the higher order numeral wheel, said window plate having an aperture therein of size such that a numeral on the higher order numeral wheel circumference may be viewed fully when centered in said aperture, means connected to and supporting said window plate for turning movement with said higher order numeral wheel, a window plate actuating arm connected to and extending from said supporting means, a movable cam follower, a first cam surface and a second cam surface on said lower order numeral wheel, said cam follower engaging said first cam surface when addition is being performed and engaging said second cam surface when subtraction is being performed, said cam follower being movable in one direction when engaged with said first cam surface and in the opposite direction when engaged with said second cam surface whereby the window plate is movable in either of two directions, the transmitted movement being such that said arm moves said window plate in accordance with the crawl movement imparted to said higher order numeral wheel by said lower order numeral wheel whereby the correct numeral is maintained in view within said window plate aperture during crawl movement of said higher order numeral wheel.

14. A numeral wheel assembly useful in a calculating machine, said assembly comprising a numeral wheel supporting shaft, a numeral wheel rotatably supported upon said shaft, said numeral wheel having a plurality of consecutive numerals on the circumference thereof, said numerals being uniformly staggered, a window plate positioned adjacent to and covering a portion of said numeral wheel circumference, said window plate having a viewing aperture therein of a size such that a numeral on said numeral wheel circumference may be viewed fully when centered in said aperture, means supporting said window plate for swinging movement with respect to said numeral wheel circumference, a cam surface on said numeral wheel, and a cam follower on said window plate engaging said cam surface to move said window plate viewing aperture from one numeral to an adjacent numeral in accordance with the staggered position of said numerals upon rotation of said numeral wheel.

References Cited in the file of this patent

UNITED STATES PATENTS

| | | |
|---|---|---|
| 605,705 | Ensworth | June 14, 1898 |
| 838,128 | Mays | Dec. 11, 1906 |
| 1,127,061 | Mays | Feb. 2, 1915 |